US010319221B2

(12) United States Patent
Orris et al.

(10) Patent No.: US 10,319,221 B2
(45) Date of Patent: Jun. 11, 2019

(54) SYSTEMS AND METHODS FOR VEHICULAR APPLICATION OF DETECTED TRAFFIC FLOW

(71) Applicant: Ford Global Technologies, LLC, Dearborn, MI (US)

(72) Inventors: David Joseph Orris, Allen Park, MI (US); Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 15/344,469

(22) Filed: Nov. 4, 2016

(65) Prior Publication Data

US 2018/0130346 A1  May 10, 2018

(51) Int. Cl.
*G08G 1/00* (2006.01)
*G08G 1/01* (2006.01)
(Continued)

(52) U.S. Cl.
CPC ............ *G08G 1/0112* (2013.01); *B60R 11/04* (2013.01); *G08G 1/0129* (2013.01); *G08G 1/052* (2013.01); *G08G 1/096791* (2013.01); *G08G 1/133* (2013.01); *G01S 19/14* (2013.01); *G01S 19/42* (2013.01)

(58) Field of Classification Search
CPC combination set(s) only.
See application file for complete search history.

(56) References Cited

U.S. PATENT DOCUMENTS 6,094,616 A * 7/2000 Andreas ............. B60K 31/0008
340/435
7,188,025 B2 * 3/2007 Hudson, Jr. ............ G08G 1/161
340/904
(Continued)

FOREIGN PATENT DOCUMENTS

DE       19641140 A1    5/1998
JP     2008039678 A    2/2008
(Continued)

OTHER PUBLICATIONS

Search Report dated Apr. 3, 2018 for GB Patent Application No. GB1717957.3 (5 pages).

*Primary Examiner* — Jonathan M Dager
(74) *Attorney, Agent, or Firm* — Frank Lollo; Neal, Gerber & Eisenberg LLP; James P. Muraff (57) ABSTRACT

A host vehicle consistent with the present disclosure is configured to detect pass events performed by adjacent vehicles. According to some embodiments, adjacent vehicles occupy a lane aligned with (i.e., heading in the same direction as) and immediately next to the host vehicle's lane. Pass events include passed events and passing events. A passed event occurs when the host vehicle is passed by an adjacent vehicle. A passing event occurs when the host vehicle passes an adjacent vehicle. An unusually high number of passed events versus passing events indicate that the host vehicle is impeding traffic. An unusually high number of passing events versus passed events indicate that the host vehicle is traveling excessively fast. A host vehicle consistent with the present disclosure is thus enabled to determine, or at least approximate, when it is impeding traffic and when it is traveling dangerously fast with respect to traffic.

20 Claims, 10 Drawing Sheets

(51) Int. Cl.
B60R 11/04 (2006.01)
G08G 1/052 (2006.01)
G08G 1/0967 (2006.01)
G08G 1/133 (2006.01)
G01S 19/42 (2010.01)
G01S 19/14 (2010.01)

(56) References Cited

U.S. PATENT DOCUMENTS

| | | | | |
|---|---|---|---|---|
| 7,706,963 | B2 * | 4/2010 | Parikh | G08G 1/127 340/901 |
| 8,494,759 | B2 * | 7/2013 | Hada | G08G 1/0112 701/117 |
| 8,688,321 | B2 * | 4/2014 | Prakah-Asante | G08G 1/166 180/170 |
| 8,731,809 | B2 | 5/2014 | Koshizen | |
| 8,996,224 | B1 * | 3/2015 | Herbach | G05D 1/0011 180/116 |
| 9,014,954 | B2 * | 4/2015 | Sato | G08G 1/0112 701/118 |
| 9,191,854 | B2 * | 11/2015 | Yamamoto | H04W 52/282 |
| 9,672,734 | B1 * | 6/2017 | Ratnasingam | G08G 1/0112 |
| 2002/0021229 | A1 * | 2/2002 | Stein | B60K 31/0008 340/933 |
| 2005/0256630 | A1 * | 11/2005 | Nishira | B60K 31/0008 701/96 |
| 2009/0055095 | A1 * | 2/2009 | Urban | B60W 40/02 701/301 |
| 2009/0184844 | A1 * | 7/2009 | Faber | G06K 9/00825 340/937 |
| 2009/0243883 | A1 * | 10/2009 | Simon | G08G 1/096716 340/905 |
| 2010/0045452 | A1 * | 2/2010 | Periwal | B60Q 9/00 340/439 |
| 2010/0134320 | A1 * | 6/2010 | Chevion | G08G 1/164 340/932 |
| 2011/0093177 | A1 * | 4/2011 | Horn | B60W 30/16 701/70 |
| 2011/0246052 | A1 * | 10/2011 | Zaitsu | G08G 1/096716 701/118 |
| 2012/0188374 | A1 * | 7/2012 | Taner | B60W 30/18163 348/148 |
| 2013/0345955 | A1 * | 12/2013 | Tashiro | G01C 21/32 701/118 |
| 2014/0358413 | A1 * | 12/2014 | Trombley | G06G 1/00 701/118 |
| 2015/0149059 | A1 * | 5/2015 | Choi | B60W 30/146 701/96 |
| 2015/0274062 | A1 * | 10/2015 | Wen | B60K 31/18 348/77 |
| 2015/0321699 | A1 * | 11/2015 | Rebhan | B60Q 9/00 701/23 |
| 2015/0356869 | A1 * | 12/2015 | Young | G08G 1/0133 340/901 |
| 2016/0042239 | A1 * | 2/2016 | Fowe | G06T 7/20 382/104 |
| 2016/0042644 | A1 * | 2/2016 | Velusamy | H04W 4/70 340/435 |
| 2016/0104376 | A1 * | 4/2016 | Fowe | G08G 1/0112 701/119 |
| 2016/0167668 | A1 * | 6/2016 | Prokhorov | B60W 30/18009 701/23 |
| 2016/0221575 | A1 * | 8/2016 | Posch | B60W 50/0098 |
| 2016/0272201 | A1 * | 9/2016 | Kang | G05D 1/00 |
| 2017/0061788 | A1 * | 3/2017 | Burke | G08G 1/052 |
| 2017/0110021 | A1 * | 4/2017 | Skagius | B60W 50/14 |
| 2017/0116851 | A1 | 4/2017 | Burke et al. | |
| 2017/0129501 | A1 * | 5/2017 | Lee | B60W 50/14 |
| 2017/0243484 | A1 * | 8/2017 | Li | G08G 1/096716 |
| 2017/0294117 | A1 * | 10/2017 | Burke | G08G 1/0112 |

FOREIGN PATENT DOCUMENTS

| | | |
|---|---|---|
| JP | 2009214838 A | 8/2009 |
| JP | 4716115 B2 | 7/2011 |

* cited by examiner

| Entry No. | Code | Time-stamp | Total Number of Aligned Lanes | Host Vehicle Lane (Starting From the Right) | Adjacent Vehicle Lane | Modified Speed Limit | Host Speed | Adjacent Speed |
|---|---|---|---|---|---|---|---|---|
| 1 | Passed | 5:00pm | 4 | 1 | 2 | 55mph | 50mph | 60mph |
| 2 | Passing | 5:01pm | 2 | 1 | 2 | 55mph | 67mph | 62mph |
| 3 | Passed | 5:05pm | 3 | 3 | 2 | 60mph | 55mph | 58mph |

Current Speed or Modified Speed Limit

| Road Conditions | 10mph | 20mph | 40mph |
|---|---|---|---|
| Ideal | 15 Feet | 30 Feet | 60 Feet |
| Acceptable | 17 Feet | 34 Feet | 68 Feet |
| Poor | 20 Feet | 40 Feet | 80 Feet |

SYSTEMS AND METHODS FOR VEHICULAR APPLICATION OF DETECTED TRAFFIC FLOW

TECHNICAL FIELD

This disclosure relates to, among other things, guiding a vehicle based on traffic flow.

BACKGROUND

Many roads include multiple lanes heading in the same direction. Speed of traffic flow often varies between the lanes, such that some lanes are slower than other lanes. There are many different sources of lane slowing. Some sources are intended and thus unavoidable. For example, one lane may be blocked by an obstacle (e.g., a police car or traffic cones), thus requiring drivers to slow down. Other sources are unintended and thus avoidable. For example, a vehicle may be traveling excessively under the speed limit without cause.

Although some variation in speed of traffic flow between lanes is normal, excessive slowing in one lane, but not in other lanes, may present problems. For example, excessive slowing in one lane may jam traffic, thus wasting fuel and aggravating drivers. As another example, excessive slowing in one lane may cause drivers to lane change from the slower lane to a faster lane. The probability of collision is often greater during a lane change than forward driving. Thus, extra lane changes increase the risk of collision between vehicles.

Accordingly there is a need for new systems and methods that reduce the probability of lane changes due to unintended or avoidable sources of lane slowing.

SUMMARY

A host vehicle consistent with the present disclosure is configured to detect pass events performed by adjacent vehicles. According to some embodiments, adjacent vehicles occupy a lane aligned with (i.e., heading in the same direction as) and immediately next to the host vehicle's lane. Passing events include passed events and passing events. A passed event occurs when the host vehicle is passed by an adjacent vehicle. A passing event occurs when the host vehicle passes an adjacent vehicle.

The pass events may be weighted according to various factors, including the respective positions of the host vehicle's lane and the adjacent vehicle's lane. For example, a passed event where the adjacent vehicle is to the left of the host vehicle may be weighted to a lesser degree and a passed event where the adjacent vehicle is to the right of the host vehicle may be weighted to a greater degree. The opposite may be true for passing events.

An unusually high number of passed events versus passing events indicate that the host vehicle is impeding traffic. An unusually high number of passing events versus passed events indicate that the host vehicle is traveling excessively fast. A host vehicle consistent with the present disclosure is thus enabled to determine, or at least approximate, when it is impeding traffic and when it is traveling dangerously fast with respect to traffic.

Additional advantages of the present embodiments will become apparent after reading the following detailed description. It should be appreciated that the embodiments disclosed herein are only examples and do not limit the claimed inventions. Put differently, disclosed features are not intended to limit or narrow the claims. As a result, the claimed inventions may be broader than the disclosed embodiments.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 3A is a top plan view of a road including three inbound lanes and 2 outbound lanes. FIG. 3A is taken at a first point in time.

FIG. 8 is a top plan view of a curved portion of the road of FIGS. 3A and 3B. FIG. 8 is taken at a later third point in time.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
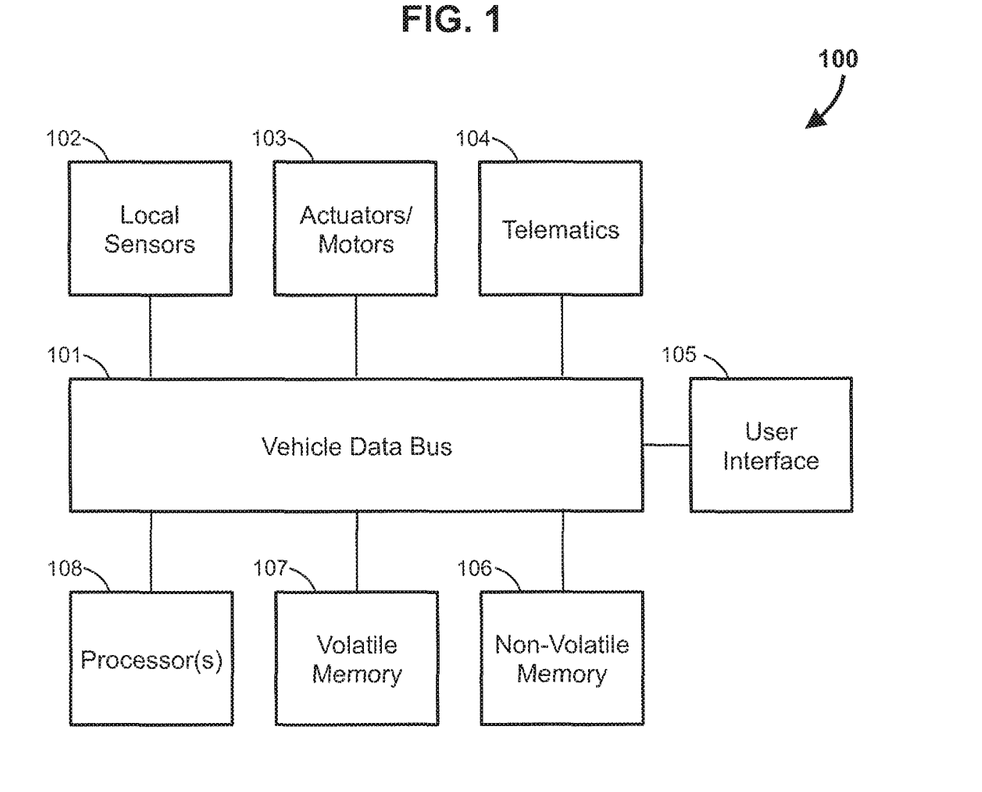
FIG. 1 is a block diagram of a vehicle computing system.

FIG. 1 shows a computing system 100 of host vehicle 200. Host vehicle 200 is connected, meaning that host vehicle 200 is configured to (a) receive wireless data from external entities (e.g., infrastructure, servers, other connected vehicles) and (b) transmit wireless data to external entities. Host vehicle 200 may be autonomous, semi-autonomous, or manual. Host vehicle 200 includes a motor, a battery, at least one wheel driven by the motor, and a steering system configured to turn the at least one wheel about an axis. Host vehicle 200 may be fossil fuel powered (e.g., diesel, gasoline, natural gas), hybrid-electric, fully electric, fuel cell powered, etc.

Vehicles are described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie"), and U.S. patent application Ser. No. 14/972,761 to Hu et al. ("Hu"), all of which are hereby incorporated by reference in their entireties. Host vehicle 200 may include any of the features described in Miller, Prasad, Lavoie, and Hu.

Computing system 100 resides in host vehicle 200. Computing system 100, among other things, enables automatic control of mechanical systems within host vehicle 200 and facilitates communication between host vehicle 200 and external entities (e.g., connected infrastructure 301, the Internet, other connected vehicles 201). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touchscreen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, motors mounted to sensors (e.g., a motor configured to swivel a local sensor 102), engines, power train motors, steering, etc. Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors, clocks, moisture sensors, rain sensors, light sensors, etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
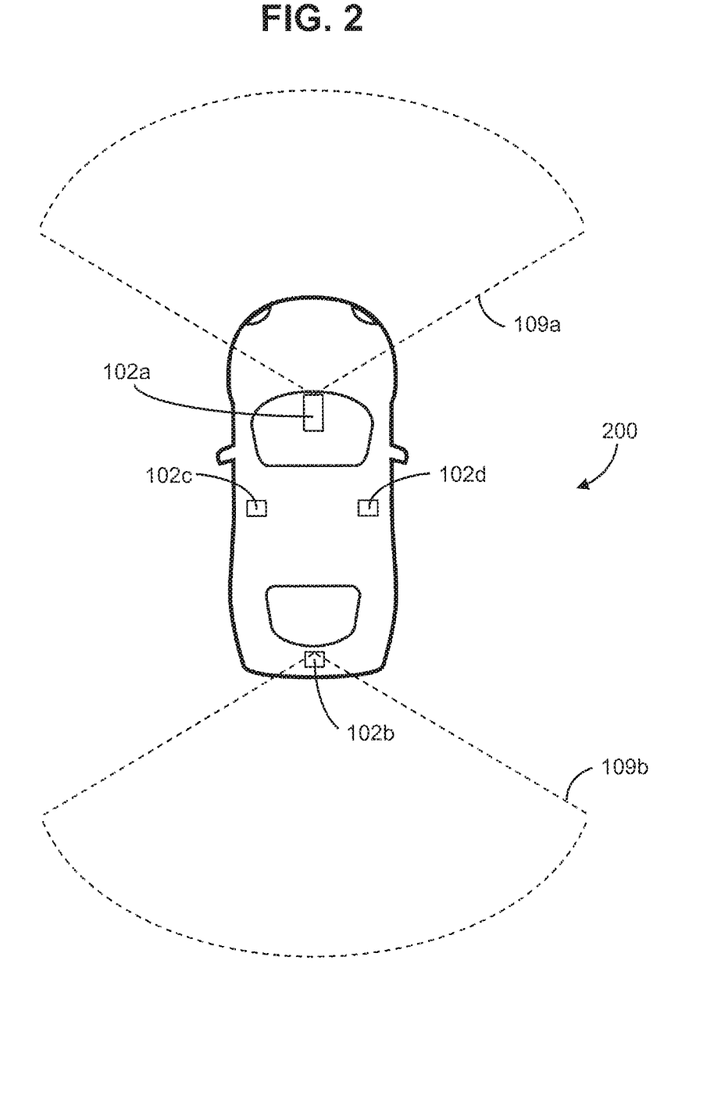
FIG. 2 is a top plan view of a host vehicle including the vehicle computing system.

FIG. 2 generally shows and illustrates host vehicle 200, which includes computing system 100. Some of the local sensors 102 are mounted on an exterior of host vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. Host vehicle 200 includes a plurality of other local sensors 102 located in the vehicle interior or on the vehicle exterior. Local sensors 102 may include any or all of the sensors disclosed in Miller, Prasad, Lavoie, and Hu.

It should be appreciated that host vehicle 200 is configured to perform the methods and operations described herein. In some cases, host vehicle 200 is configured to perform these functions via computer programs stored on volatile 107 and/or non-volatile 106 memories of computing system 100.

One or more processors are "configured to" perform a disclosed method step, block, or operation, at least when at least one of the one or more processors is in operative communication with memory storing a software program with code or instructions embodying the disclosed method step or block. Further description of how processors, memory, and software cooperate appears in Prasad. According to some embodiments, a mobile phone or an external server in operative communication with host vehicle 200 perform some or all of the methods and operations discussed below.

According to various embodiments, host vehicle 200 includes some or all of the features of vehicle 100a of Prasad. According to various embodiments, computing system 100 includes some or all of the features of VCCS 102 of FIG. 2 of Prasad. According to various embodiments, host vehicle 200 is in communication with some or all of the devices shown in FIG. 1 of Prasad, including nomadic device 110, communication tower 116, telecom network 118, Internet 120, and data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels."

The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Each of the entities described in this application (e.g., the connected infrastructure, the other vehicles, mobile phones, servers) may share any or all of the features described with reference to FIGS. 1 and 2.

Figure 3A:
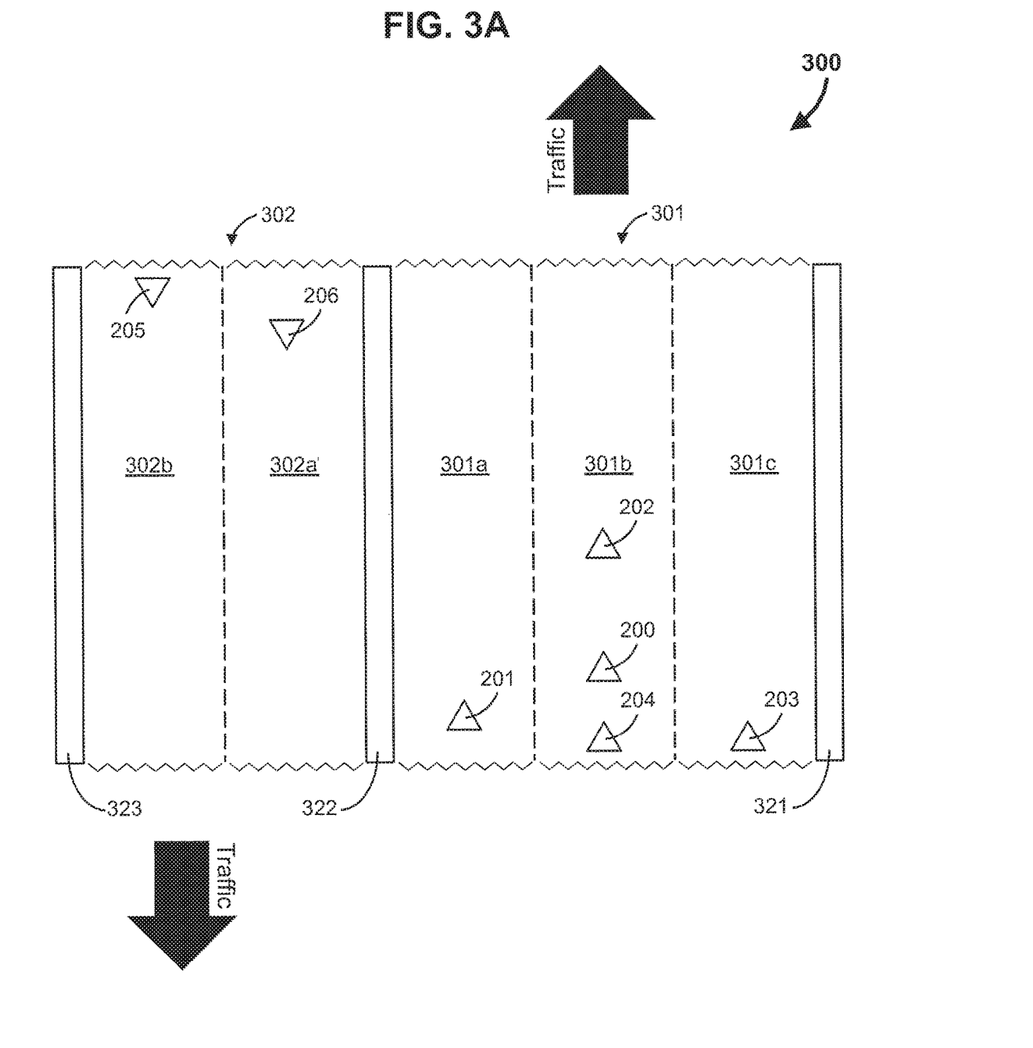
Figure 3B:
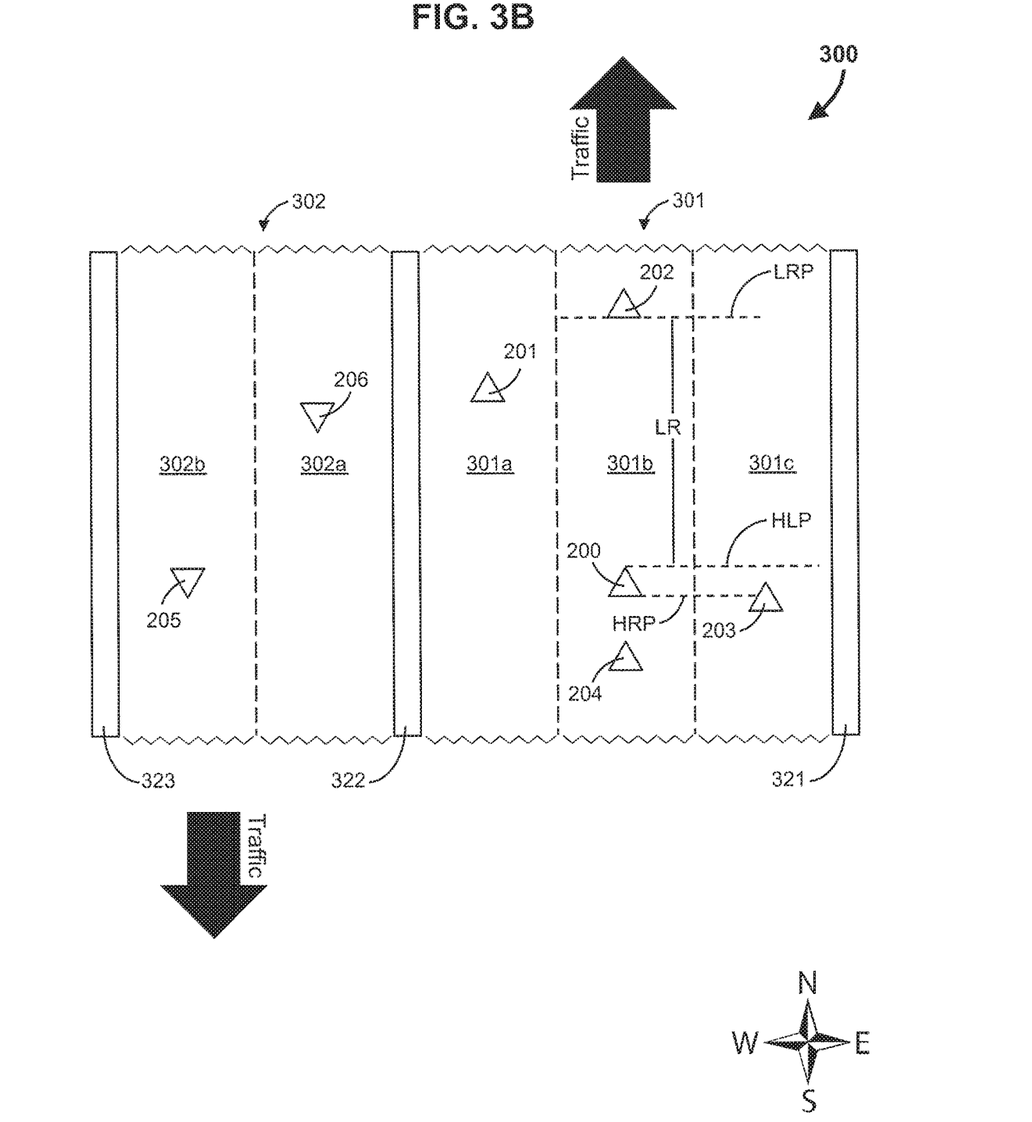
FIG. 3B is a top plan view of the road of FIG. 3A at a later second point in time.

With reference to FIGS. 3A and 3B, road 300 includes inbound lanes 301 and outbound lanes 302. Inbound lanes 301 are defined between a first divider and a second divider 322. Inbound lanes 301 include a first inbound lane 301a, a second inbound lane 301b, and a third inbound lane 301. Traffic in inbound lanes 301 flows North. Outbound lanes 302 are defined between second divider 322 (also known as a median) and a third divider 323. Outbound lanes 302 include a first outbound lane 302a and a second outbound lane 302b. Traffic in outbound lanes 302 flows South. The dividers 321, 322, 333 may be grass, concrete, painted lines, etc. Adjacent lanes are separated by painted lines (shown, but not labeled).

Host vehicle 200, first vehicle 201, second vehicle 202, third vehicle 203, and fourth vehicle 204 are traveling North on inbound lanes 301. Fifth vehicle 205 and sixth vehicle 206 are traveling South on outbound lanes 302. First, second, third, fourth, fifth, and sixth vehicles 201 to 206 may be configured to include some or all of the features of host vehicle 200. Thus, some or all of the vehicles 200 to 206 may be configured to perform the operations disclosed in the present application. At least some of first to sixth vehicles 201 to 206 may be legacy (i.e., unconnected) vehicles.

In FIG. 3A, each of the vehicles 200 to 206 has a first respective position and in FIG. 3B, each of the vehicles 200 to 206 has attained a second respective position. Thus, FIG. 3A shows the first respective positions of the vehicles 200 to 206 at a first point in time and FIG. 3B shows the second respective positions of the vehicles 200 to 206 at a second, later point in time.

Figure 4:
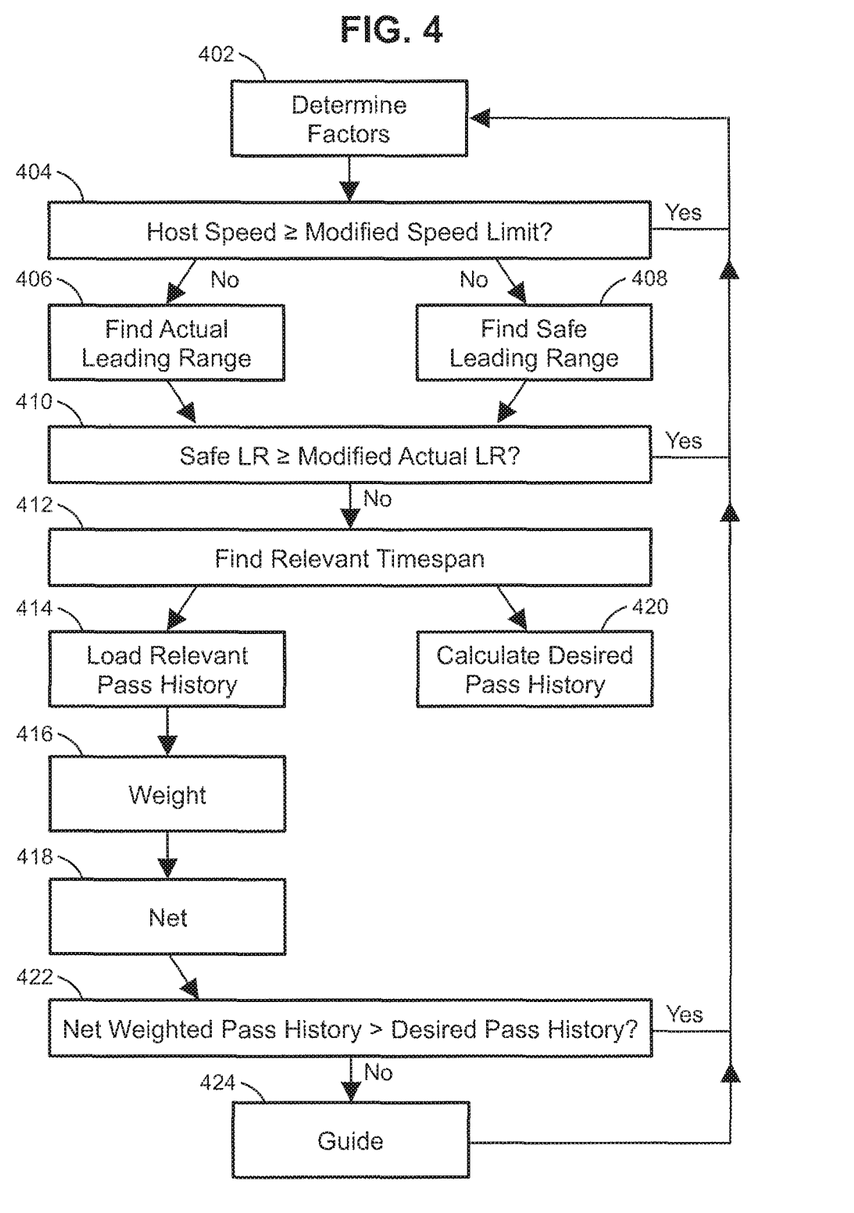
FIG. 4 is a block diagram of operations conducted by the host vehicle to generate guidance based on pass history.

With reference to FIG. 4, host vehicle 200 may be configured to determine whether it is obstructing traffic flow of inbound lanes 301. Upon an affirmative determination, host vehicle 200 may guide its driver and/or issue a message (e.g., via DSRC) to surrounding vehicles. The message may warn the surrounding vehicles that host vehicle 200 is impeding traffic in a specific and identified lane.

At block 402, host vehicle 200 determines various factors, which include one or more of: (a) host vehicle velocity, (b) current road, (c) number of aligned lanes, (d) respective positions of the aligned lanes, (e) current lane, (f) speed limit of current lane, and (g) road conditions. Host vehicle velocity or host velocity is a current velocity of host vehicle 200. Current road is the identity of the road currently occupied by host vehicle 200 (e.g., road 300 in FIGS. 3A and 3B). Aligned lanes are lanes carrying traffic in the same direction as host vehicle 200 (e.g., inbound lanes are aligned lanes host vehicle 200 is inbound and outbound lanes are aligned lanes when host vehicle 200 is outbound). As further discussed below, respective positions of the aligned lanes may include a left-most late, a right-most lane, and intermediate lanes. Current lane is the lane occupied by host vehicle 200. Road conditions are environmental factors influencing road safety (e.g., weather, time of day, etc.).

Host vehicle 200 may measure host vehicle velocity via speed and orientation sensors of host vehicle 200. Host vehicle 200 may determine the current road with reference to a GPS location of host vehicle 200 and a base map, which may be received from an external server and include coordinates of road boundaries and lane boundaries. The base map may include the number of inbound and outbound lanes for each road. By referring to the base map, host vehicle 200 may determine the number of aligned lanes and the positions thereof based on host vehicle heading and/or host vehicle GPS coordinates. Host vehicle 200 may determine the current lane by comparing current GPS coordinates to lane boundary coordinates.

Road conditions may be determined via local sensors 102 (e.g., moisture sensors, rain sensors, light sensors, clocks) and/or via downloads from an external sever (e.g., a weather server). Host vehicle 200 may determine posted or nominal speed limit of the current lane with reference to the base map, which may provide nominal or posted speed limits for each road lane. In some cases, the base map will post speed limits by road or road section, which may be applied to each of the lanes.

At block 404, host vehicle 200 compares a magnitude of host velocity (i.e., host speed) to a modified speed limit of the current lane (explained below). If host velocity meets or exceeds the modified speed limit, then host vehicle 200 returns to block 402. If host velocity is below the modified speed limit, then host vehicle 200 may proceed to blocks 406 and 408. Host vehicle 200 may return to block 402 from block 404, even if host velocity is below the modified speed limit, when current lane curvature and/or lane curvature within a predetermined distance of current host vehicle position exceeds a predetermined radius of curvature. The predetermined distance may be a function of host vehicle velocity and/or the modified speed limit.

The modified speed limit is a function of the current lane (e.g., relative position of the current lane [right-most, intermediate, left-most], current curvature, upcoming curvature, etc.) and road conditions (e.g., time of day, measured amount of light, weather). Host vehicle 200 may be configured such that the modified speed limit can fall below, but never exceed, the actual speed limit of the current lane.

According to some embodiments, the modified speed limit is set as a median or average speed of vehicles within a predetermined distance of host vehicle 200 and traveling in the same direction (i.e., traveling in an aligned lane). This information may be received via telematics 104 (e.g., via DSRC). The predetermined distance may be calculated based on current curvature of the current lane such that only vehicles performing a turn comparable to host vehicle 200 (in order to follow the curvature of the lane) are considered. A database resident in host vehicle 200 timestamps each new modified speed limit.

At block 406, host vehicle 200 detects an actual leading range, which is a current distance between a forward tip of host vehicle 200 and a rear tip of the vehicle directly leading host vehicle 200 (i.e., the leading or directly leading vehicle). With reference to FIG. 3B, second vehicle 202 is directly leading host vehicle 200. A reference host leading plane (HLP) intersects the leading tip of host vehicle 200. A reference leading rear plane (LRP) intersects the trailing tip of second or leading vehicle 202. The segment between HLP and LRP is the leading range (or LR).

Figure 8:
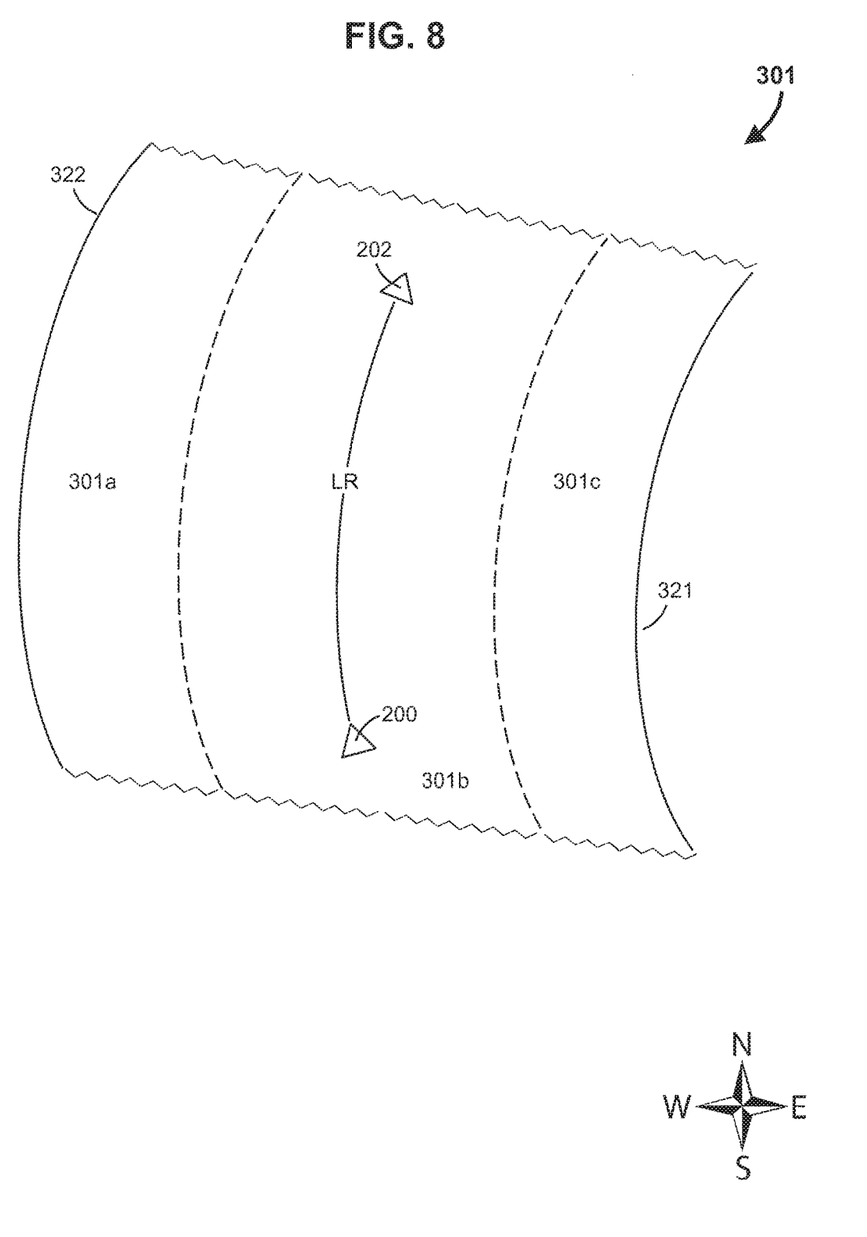

As shown in FIG. 8, when the current lanes curves between host vehicle 200 and the directly leading vehicle, segment LR may be curved to align with curvature of the lane. Thus, segment LR may be defined to pass through the transverse midpoints of the current lane. For example, when host vehicle 200 is in second inbound lane 301b, the transverse midpoints are equidistance from the East side of first inbound lane 301a and the West side of third inbound lane 301c; when host vehicle is in first inbound lane 301a, the transverse midpoints are equidistant from the East edge of median 322 and the West edge of second inbound lane 301b.

Host vehicle 200 may detect the actual leading range via one or more suitable local sensors 102 (e.g., lidar sensors and/or ultrasonic sensors), which are configured to detect a distance measurement between two points. These distance measurements may be adjusted for curvature of the road, which may be extracted from the reference map. The local sensors 102 may be rotated based on the curvature of the road, to following leading vehicle 202

Host vehicle 200 may scan 360 degrees of the surrounding environment with local sensors 102 at a predetermined frequency. As is known in the art, suitable processing software may be applied to convert the measurements into a virtual map of surrounding vehicles. Examples of virtual map processing software are disclosed in U.S. patent application Ser. No. 15/332,876 to Bennie, which is hereby incorporated by reference in its entirety.

The position of leading or second vehicle 202 may be determined with reference to the virtual map and the road/lane curvature information of the base map (e.g., host vehicle 200 may compare detected coordinates of each vehicle resident in the virtual map with the known coordinates of the lanes stored in the base map to determine which, if any, of the detected vehicles are directly leading).

Figure 9:
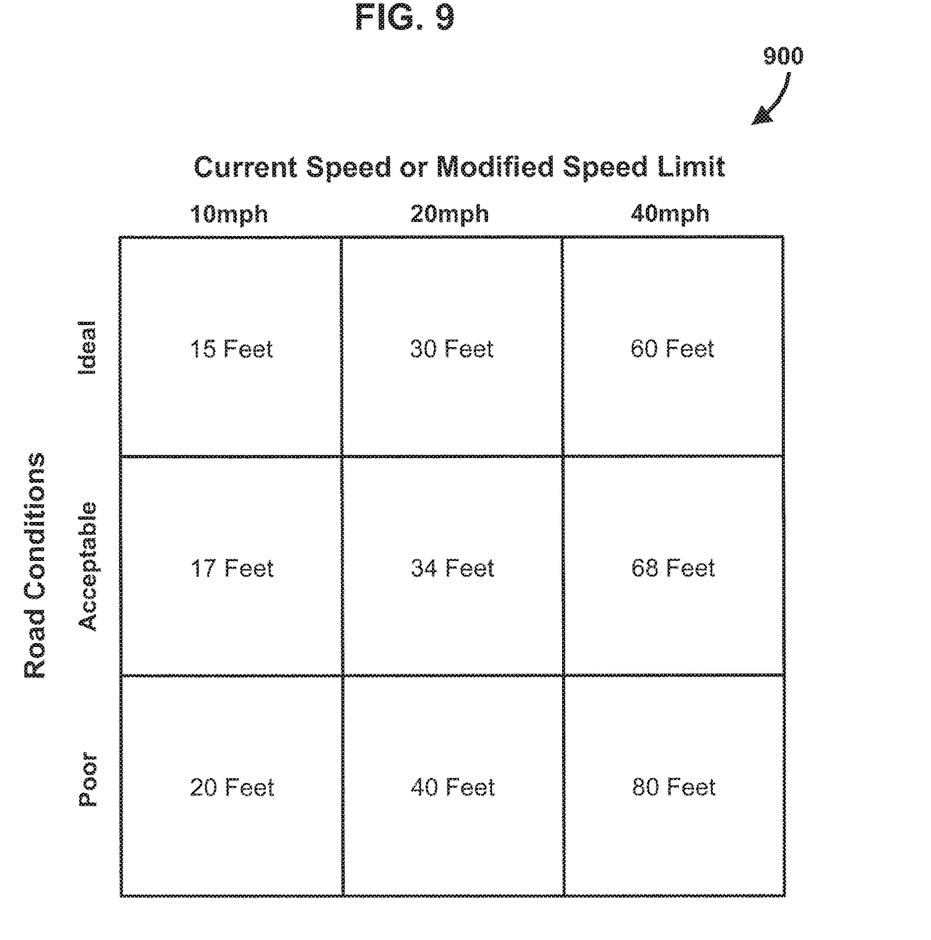
FIG. 9 is a lookup table for determining safe leading range.

At block 408, a safe leading range is calculated on (a) current speed of host vehicle 200 or the modified lane speed limit and (b) current road conditions. The calculation may be performed with one or more preprogrammed formulas. FIG. 9 shows one example formula embodied as two-dimensional lookup table 900 (three or four dimensional lookup tables may be suitable). Lookup table 900 includes the current speed or modified speed limit on an X-axis and road conditions (e.g., ideal, acceptable, poor) on a Y-axis. After selecting an X-axis value (e.g., 20 mph) and a Y axis value (e.g., acceptable), host vehicle 200 arrives at a safe leading range (in this case 34 feet). In practice, lookup table 900 would include more than 9 entries. Instead of being labeled in generic terms, the Y axis values may be more concrete (e.g., value 1=10 lux and dry conditions; value 2=9 lux and dry conditions; value 300=10 lux and 2 inches of snow; value 500=8 lux and 1 inch of rain per hour).

At block 410, the actual leading range is compared with the safe leading range. If the safe leading range is greater than or equal to the actual (i.e., detected) leading range, then host vehicle 200 returns to block 402. Otherwise, host vehicle 200 proceeds to block 412.

At block 412, host vehicle 200 selects a relevant timespan. The relevant timespan may be a fixed or set amount of time (e.g., 2 minutes). The relevant timespan may be based on a history of modified speed limits calculated by host vehicle 200. For example, the relevant timespan may extend backwards in time until reaching a modified speed limit outside a predetermined range (e.g., 0%, 5%, 10%) of the current modified speed limit.

For example, if the predetermined range is 5%, the current modified speed limit is 55 mph, the modified speed limit 1 minute prior is 55 mph, the modified speed limit 2 minutes prior is 55 mph, the modified speed limit 3 minutes prior is 54 mph, and then the modified speed limit 4 minutes prior is 40 mph then the relevant time span may be 3 minutes. The modified speed limits of the most recent 3 minutes would be inside the predetermined range (i.e., 55 mph±5%), while the modified speed limit 4 minutes prior was outside the predetermined range (40 mph<55 mph−5%).

The predetermined range may be positively correlated with the current modified speed limit, such that at higher speeds, the predetermined range is longer and at lower speeds, the predetermined range is shorter.

At block 414, host vehicle 200 loads a relevant pass history. Pass history is further explained below with reference to FIG. 5. In general terms, pass history includes (a) events corresponding to host vehicle 200 being passed by other vehicles, and (b) events corresponding to host vehicle 200 passing other vehicles. The relevant pass history includes passed and passing entries having a timestamp falling within the relevant timespan.

At block 416, host vehicle 200 weights the relevant pass history. More specifically, each event of the relevant pass history is weighted. An event can be weighted based on the relative lane position of host vehicle 200 and/or the passing/passed vehicle during the event. Weighting may be advantageous because the right hand side of a lane group (e.g., third inbound lane 301c and second outbound lane 302b) generally carries slower traffic than the left hand side of a lane group (e.g., first inbound lane 301a and first outbound lane 302a). Put differently, vehicles in right lanes should expect to be passed by vehicles in left lanes.

Thus, passed events where the adjacent vehicle was to the left of host vehicle 200 may be assigned a lesser weight. Similarly, passed events where the adjacent vehicle was to the right of host vehicle 200 may be assigned a greater weight. In addition, passing events where the adjacent vehicle was to the left of host vehicle 200 may be assigned a greater weight and passed events where the adjacent vehicle was to the right of host vehicle 200 may be assigned a lesser weight.

Figure 7:
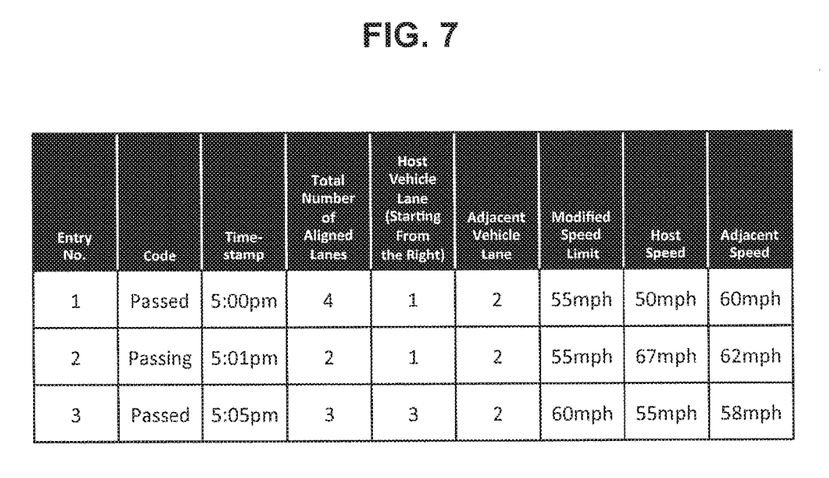
FIG. 7 is an example pass history.

At block 418, the weighted pass history is netted by (a) summing the total number of passing entries (each entry may be weighted as described above), (b) summing the total number of passed entries (each entry may be weighted as described above), and (c) subtracting (b) from (a). FIG. 7 shows three example entries of an example pass history. In Entry 1, host vehicle 200 was passed, on the left, by an adjacent vehicle. In Entry 2, an adjacent vehicle was passed, on the right, by host vehicle 200. In Entry 3, host vehicle 200 was passed, on the right, by an adjacent vehicle.

The net weighted pass history may equal to: Entry 2−(Entry 1+Entry 3)=$1*W_{passing,right}-(1*W_{passed,left}+1*W_{passed,right})$. $W_{passing,right}$=weight assigned to host vehicle 200 passing to the right of an adjacent vehicle (e.g., 1.5). $W_{passed,left}$=weight assigned to host vehicle 200 being passed, on the left, by an adjacent vehicle (e.g., 0.7). $W_{passed,right}$=weight assigned to host vehicle 200 being passed, on the right, by an adjacent vehicle (e.g., 1.5). Although not used in the above equation, $W_{passing,left}$=weight assigned to host vehicle 200 passing to the left of an adjacent vehicle (e.g., 0.7).

At block 420, a desired pass history threshold is found. The desired pass history threshold may be a function of: (a) the amount of time spent by host vehicle 200 in the right-most lane during the relevant timespan, (b) a time or distance-based weighted average of the host vehicle speeds or the modified speed limits present during (a), (c) the total amount of time spent by host vehicle 200 in intermediate lanes during the relevant timespan, (d) a time or distance-based weighted average of the host vehicle speeds or the modified speed limits present during (c), (e) the total amount of time spent by host vehicle 200 in the left-most lane during the relevant timespan, and (f) a time or distance-based weighted average of the host vehicle speeds or the modified speed limits present during (e).

For example, in one exemplary case the relevant timespan is 3 minutes, the weighted average is time-based and corresponds to modified speed limits. Assume that host vehicle 200 has spent 1 minute in the right-most lane with a modified speed limit of 50 mph, 1 minute in the right-most lane with a modified speed limit of 60 mph, and 1 minute in the intermediate lane with a modified speed limit of 65 mph. The desired pass history threshold would now be a function of (a) 2 minutes spent in the right-most lane, (b) a time-averaged modified speed limit of 55 mph for (a), (c) 1 minute spent in the intermediate lane, and (d) a time-averaged modified speed limit of 65 mph.

As an illustrative example, the function may be computed as follows: Desired pass history threshold=F(2 minutes and 55 mph, 1 minute and 65 mph, and 0/0)=$F_{right-most\ lane}$(2 minutes and 55 mph)+$F_{intermediate}$(1 minute and 65 mph)+$F_{left-most\ lane}$(0/0). $F_{right-most\ lane}$ may produce negative values, wherein the magnitude of the negative values are proportional to the modified speed limit; $F_{intermediate\ lane}$ may produce a zero value; and $F_{left-most\ lane}$ may produce positive values, wherein the magnitude of the positive values are proportional to the modified speed limit. In this case, $F_{right-most\ lane}$(2 minutes and 55 mph)+$F_{intermediate\ lane}$(1 minute and 65 mph)+$F_{left-most\ lane}$(0/0) could be equal to: 2 minutes*(−3/minute)+1 minute*0+0*0=−6. Thus, the threshold would be −6.

At block 422, the net weighted pass history is compared with the desired pass history threshold. If the net weighted pass history is less than the desired pass history threshold, then host vehicle 200 proceeds to block 424. Otherwise, host vehicle 200 returns to block 402.

At block 424, host vehicle 200 guides the driver and/or nearby vehicles. Guiding may include an audio or visual warning (e.g., a sound alarm, a warning light, a message displayed on a touchscreen) directed to the driver via user interface 105. Guiding may include activating one or more rear lights of host vehicle 200 to warn incoming vehicles that host vehicle 200 is obstructing traffic. The rear lights may be the emergency flashers. Guiding may include transmitting a message to nearby vehicles trailing host vehicle 200 indicating a lane and current speed of host vehicle 200.

Figure 5:
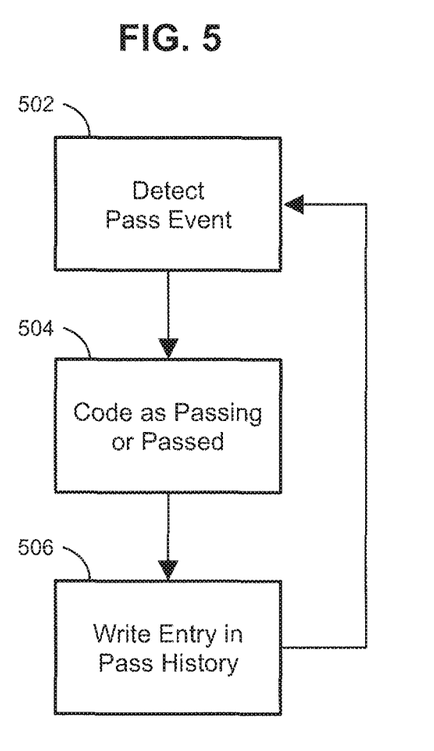
FIG. 5 is a block diagram of operations conducted by the host vehicle to generate a pass history.

With reference to FIG. 5, host vehicle 200 may be configured to generate the pass history. At block 502, a pass event is detected with based on measurements of adjacent vehicles captured with local sensors 102. Pass events may only occur in aligned lanes immediately adjacent to the current lanes. For example, first vehicle 201 (if performing the present operations) would not record pass events with respect to third vehicle 203 because second inbound lane 301b separates first vehicle 201 from third vehicle 203. Put differently, and according to some embodiments, third vehicle 203 is considered to be non-adjacent to first vehicle 201 by virtue of second inbound lane 301b.

At block 504, a pass event is coded as a passing event or a passed event. When an adjacent vehicle begins at a location in front of host leading plane HLP, intersects host leading plane HLP, intersects host rear plane HRP, and ends at a location behind host rear plane HRP, a passing event is recorded. When an adjacent vehicle begins at a location behind host rear plane HRP, intersects host rear plane HRP, intersects host leading plane HLP, and ends at a location in front of host leading plane HLP, a passed event is recorded. The presence of these conditions may be determined with reference to the virtual map (discussed above).

Between FIGS. 3A and 3B, fifth vehicle 205 passes sixth vehicle 206. Fifth vehicle 205 (if performing the present operations) would record a passing event. Sixth vehicle 206 (if performing the present operations) would record a passed event.

Each event may be recorded as a discrete entry in the pass history. As stated above, FIG. 7 is an exemplary and illustrative pass history. Each discrete entry may include one or more of: a timestamp of the event, the modified speed limit at the event, the host vehicle speed at the event, the adjacent vehicle speed at the event, the host lane at the event, the adjacent vehicle lane at the event, and any other of the above-described properties referenced during the execution of FIG. 4 or shown in FIG. 7.

Figure 6:
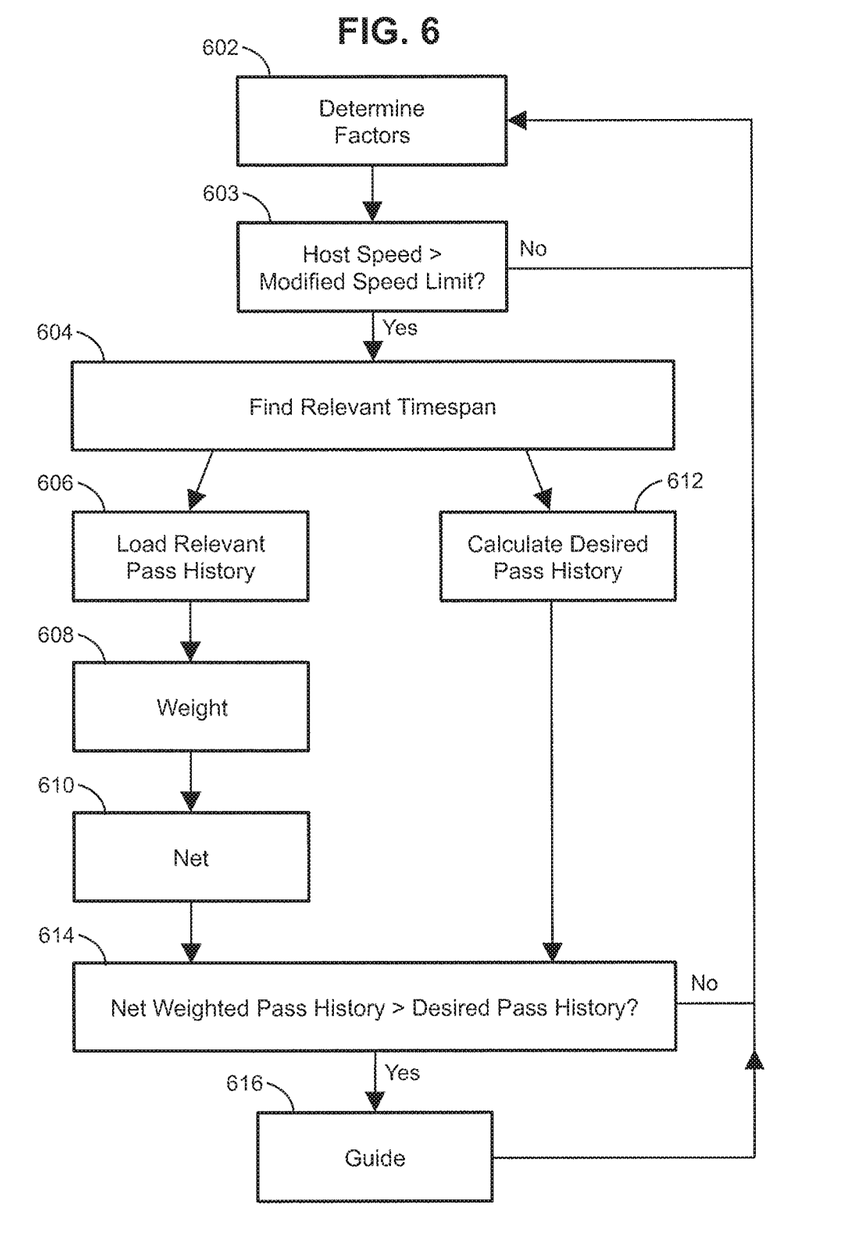
FIG. 6 is a block diagram of operations conducted by the host vehicle to generate guidance based on pass history.

With reference to FIG. 6, operations similar to those disclosed in FIG. 4 may be performed to detect, or at least approximate, when host vehicle 200 is traveling excessively fast. The operations disclosed in FIG. 6 may generate guidance, even when host vehicle 200 is traveling below the modified speed limit.

At block 602, some or all of the factors disclosed with reference to block 402 are determined. At block 604, a relevant timespan is determined. This relevant timespan may be calculated via some or all of the operations disclosed with reference to block 412. At block 603, it is determined whether host vehicle 200 exceeds the modified speed limit, which may be calculated as described above with reference to FIG. 4. If host vehicle 200 is above the modified speed limit, then operations proceed to block 604. If host vehicle 200 is at or below the modified speed limit, then operations return to block 602. It should be appreciated that blocks 606, 608, 610, and 612 may respectively include some or all of the operations disclosed with reference to blocks 414, 416, 418, and 420.

At block 614, net weighted pass history is compared to desired pass history. If net weighted pass history exceeds the desired pass history, then host vehicle 200 guides the driver at block 616. If net weighted pass history does not exceed the desired pass history, then host vehicle 200 returns to block 602. The guidance of block 616 may include some or all of: (a) speed limiting host vehicle 200 (i.e., enforcing a maximum speed), (b) generating visual or audio cues inside host vehicle 200 (including warning prompts on the touchscreen display), (c) activating warning lights on the exterior of host vehicle 200, (d) transmitting a message to nearby vehicles leading host vehicle 200 indicating a lane and current speed of host vehicle 200.

Note that in FIG. 6, block 614 returns to block 602 if net weighted pass history does exceed desired pass history and that in FIG. 4, block 422 returns to block 402 if net weighted pass history does not exceed the desired pass history.

The invention claimed is:

1. A host vehicle comprising:
sensors configured to detect passing vehicles; and
processor(s) configured to:
count the passing vehicles;
determine a desired pass history threshold; and
generate a display based on a predetermined portion of the passing vehicle count exceeding the threshold.

2. The host vehicle of claim 1, wherein the processor(s) are configured to:
determine a relevant timespan; and
set the predetermined portion of the passing vehicle count based on the relevant timespan.

3. A host vehicle comprising:
sensors configured to detect passed vehicles and passing vehicles; and
processor(s) configured to:
write a pass history of the passed vehicles and the passing vehicles;
determine a desired pass history threshold;
compare the threshold to a predetermined portion of the pass history; and
generate a display based on the comparison.

4. The host vehicle of claim 3, wherein the processor(s) are configured to:
determine a relevant timespan based on a speed value; and
set the predetermined portion of the pass history based on the relevant timespan.

5. The host vehicle of claim 4, wherein the speed value is a speed limit.

6. The host vehicle of claim 5, wherein the speed limit is a modified speed limit and the processor(s) are configured to calculate the modified speed limit based on a received posted speed limit and a property of a road lane.

7. The host vehicle of claim 6, wherein the road lane is a current road lane occupied by the host vehicle, the property of the road lane is a radius of curvature of the current road lane, and the processor(s) are configured to:
determine the current road lane; and
determine the radius of curvature of the current road lane.

8. The host vehicle of claim 3, wherein the processor(s) are configured to convert the predetermined portion of the pass history into a numerical value.

9. The host vehicle of claim 8, wherein the processor(s) are configured to positively correlate the passed vehicles with the numerical value and negatively correlate the passing vehicles with the numerical value.

10. The host vehicle of claim 3, wherein the processor(s) are configured to update the pass history with first entries when corresponding ones of the passed vehicles are detected and update the pass history with second entries when corresponding ones of the passing vehicles are detected.

11. The host vehicle of claim 10, wherein the processor(s) are configured to:
weight each of the first entries based on a lane relationship between the host vehicle and the corresponding one of the passed vehicles; and
weight each of the second entries based on a lane relationship between the host vehicle and the corresponding one of the passing vehicles.

12. The host vehicle of claim 11, wherein the processor(s) are configured to compare the threshold to the predetermined portion of the pass history at least by:
noting each of the first entries and the second entries that fall within the predetermined portion;
summing the noted first entries according to the respective weights of the noted first entries;
summing the noted second entries according to the respective weights of the noted second entries;
subtracting the sum of the noted second entries from the sum of the noted first entries to generate a result; and
comparing the result with the threshold.

13. The host vehicle of claim 12, wherein the processor(s) are configured to generate a first display when the threshold exceeds the predetermined portion and generate a different second display when the predetermined portion exceeds the threshold.

14. The host vehicle of claim 3, wherein the processor(s) are configured to generate a first display when the threshold exceeds the predetermined portion and generate a different second display when the predetermined portion exceeds the threshold.

15. A method of controlling a host vehicle, the method comprising:
detecting, via sensors of the host vehicle, passed vehicles and passing vehicles;
writing, via processor(s) of the host vehicle, a pass history of the passed vehicles and the passing vehicles;
determining, via the processor(s), a desired pass history threshold;
comparing, via the processor(s), the threshold to a predetermined portion of the pass history; and
generating, via the processor(s), a display based on the comparison.

16. The method of claim 15, comprising:
determining a relevant timespan based on a speed value; and
setting the predetermined portion of the pass history based on the relevant timespan.

17. The method of claim 16, wherein the speed value is a modified speed limit and the method comprises
calculating the modified speed limit based on a received posted speed limit and a property of a road lane.

18. The method of claim 17, wherein the road lane is a current road lane occupied by the host vehicle, the property of the road lane is a radius of curvature of the current road lane, and the method comprises:
determining the current road lane; and
determining the radius of curvature of the current road lane.

19. The method of claim 15, comprising:
converting the predetermined portion of the pass history into a numerical value; and
positively correlating passed vehicles with the numerical value and negatively correlating passing vehicles with the numerical value.

20. The method of claim 15, comprising:
updating the pass history with first entries when corresponding ones of the passed vehicles are detected;
updating the pass history with second entries when corresponding ones of the passing vehicles are detected;
weighting each of the first entries based on a lane relationship between the host vehicle and the corresponding one of the passed vehicles;
weighting each of the second entries based on a lane relationship between the host vehicle and the corresponding one of the passing vehicles; and
comparing the threshold to the predetermined portion of the pass history at least by:
noting each of the first entries and the second entries that fall within the predetermined portion;
summing the noted first entries according to the respective weights of the noted first entries;
summing the noted second entries according to the respective weights of the noted second entries;
subtracting the sum of the noted second entries from the sum of the noted first entries to generate a result; and
comparing the result with the threshold.

* * * * *